US009253472B2

(12) United States Patent
Gutierrez

(10) Patent No.: US 9,253,472 B2
(45) Date of Patent: Feb. 2, 2016

(54) METHOD AND APPARATUS FOR MACRO PHOTOGRAPHIC STEREO IMAGING

(71) Applicant: Anthony Gutierrez, Stewartstown, PA (US)

(72) Inventor: Anthony Gutierrez, Stewartstown, PA (US)

(*) Notice: Subject to any disclaimer, the term of this patent is extended or adjusted under 35 U.S.C. 154(b) by 0 days.

(21) Appl. No.: 14/667,972

(22) Filed: Mar. 25, 2015

(65) Prior Publication Data

US 2015/0201183 A1  Jul. 16, 2015

Related U.S. Application Data

(62) Division of application No. 13/983,620, filed as application No. PCT/US2012/028695 on Mar. 12, 2012, now Pat. No. 9,016,960.

(60) Provisional application No. 61/465,598, filed on Mar. 11, 2011.

(51) Int. Cl.
| | |
|---|---|
| H04N 13/02 | (2006.01) |
| F16M 11/06 | (2006.01) |
| F16M 11/04 | (2006.01) |
| G03B 15/00 | (2006.01) |
| G03B 17/56 | (2006.01) |
| G03B 35/02 | (2006.01) |
| H04N 13/00 | (2006.01) |

(52) U.S. Cl.
CPC ......... *H04N 13/0282* (2013.01); *F16M 11/043* (2013.01); *F16M 11/06* (2013.01); *G03B 15/00* (2013.01); *G03B 17/561* (2013.01); *G03B 35/02* (2013.01); *H04N 13/004* (2013.01); *H04N 13/0203* (2013.01); *H04N 13/0253* (2013.01)

(58) Field of Classification Search
CPC ...... G03B 17/561; G03B 15/00; G03B 35/02; F16M 11/043; H04N 13/0282; H04N 13/004
USPC .............................. 396/428, 322, 336, 323, 5
See application file for complete search history.

(56) References Cited

U.S. PATENT DOCUMENTS

| | | | |
|---|---|---|---|
| 693,792 A | 2/1902 | Farquhar | |
| 4,123,768 A | 10/1978 | Kilshaw et al. | |
| 4,283,135 A | 8/1981 | Lupis | |
| 4,951,072 A * | 8/1990 | Harvey ................. | G03B 17/56 396/5 |
| 6,343,184 B1 | 1/2002 | Huebner | |
| 6,711,347 B1 | 3/2004 | Fritts | |
| 7,440,685 B2 * | 10/2008 | Weng ................... | F16M 11/046 396/419 |
| 8,244,117 B2 * | 8/2012 | Neith ..................... | F16M 11/10 396/1 |

(Continued)

FOREIGN PATENT DOCUMENTS

JP          2003121393 A       4/2003

*Primary Examiner* — Christopher Mahoney
(74) *Attorney, Agent, or Firm* — Elizabeth Arwine; William Eshelman

(57) ABSTRACT

A macro photographic apparatus for creating focus stacked images of a specimen may include a rigid longitudinal member having a longitudinal axis and including a camera mount thereon. A translation device may be fixed to the member for translating the specimen along the member toward and away from the camera mount. A rotation device may be mounted on the translation device. The rotation device may support the specimen and enable rotation of the specimen around first and second axes that are perpendicular to the longitudinal axis of the member. At any single position of the translation device along the longitudinal axis of the member, as the specimen is rotated around the first and second axes, the spatial location of the specimen remains substantially the same.

12 Claims, 4 Drawing Sheets

(56) References Cited

U.S. PATENT DOCUMENTS

| | | |
|---|---|---|
| 2005/0068544 A1 | 3/2005 | Doemens et al. |
| 2006/0045388 A1* | 3/2006 | Zeineh .................. G02B 21/365 |
| | | 382/312 |
| 2007/0286341 A1 | 12/2007 | Kamegawa et al. |
| 2009/0041450 A1 | 2/2009 | Fritts |
| 2011/0069880 A1 | 3/2011 | Sergieiev |
| 2011/0123188 A1 | 5/2011 | Cardwell et al. |
| 2014/0375762 A1* | 12/2014 | Ohki .................. H04N 5/23238 |
| | | 348/36 |

* cited by examiner

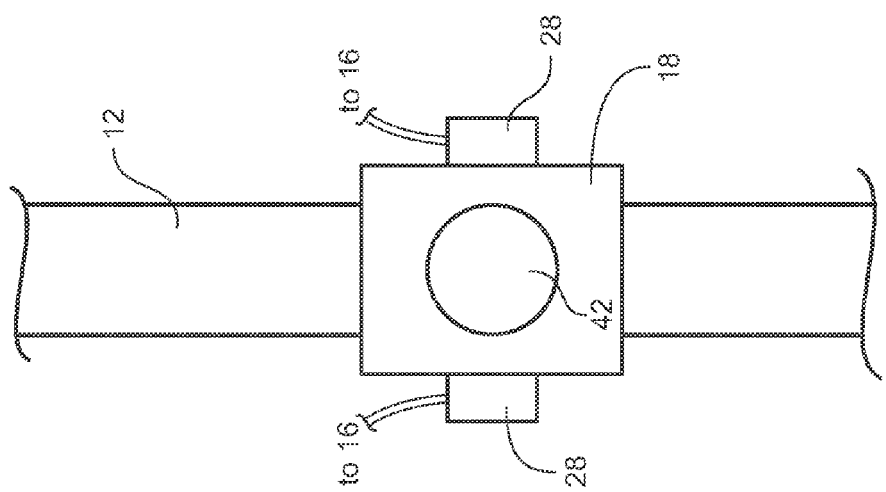
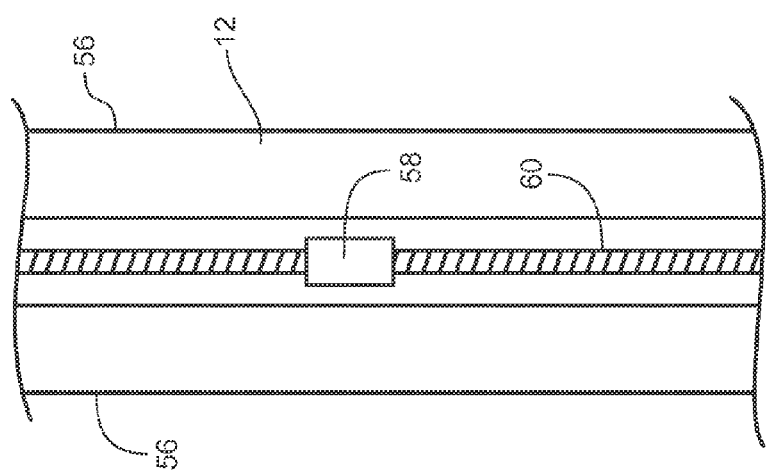

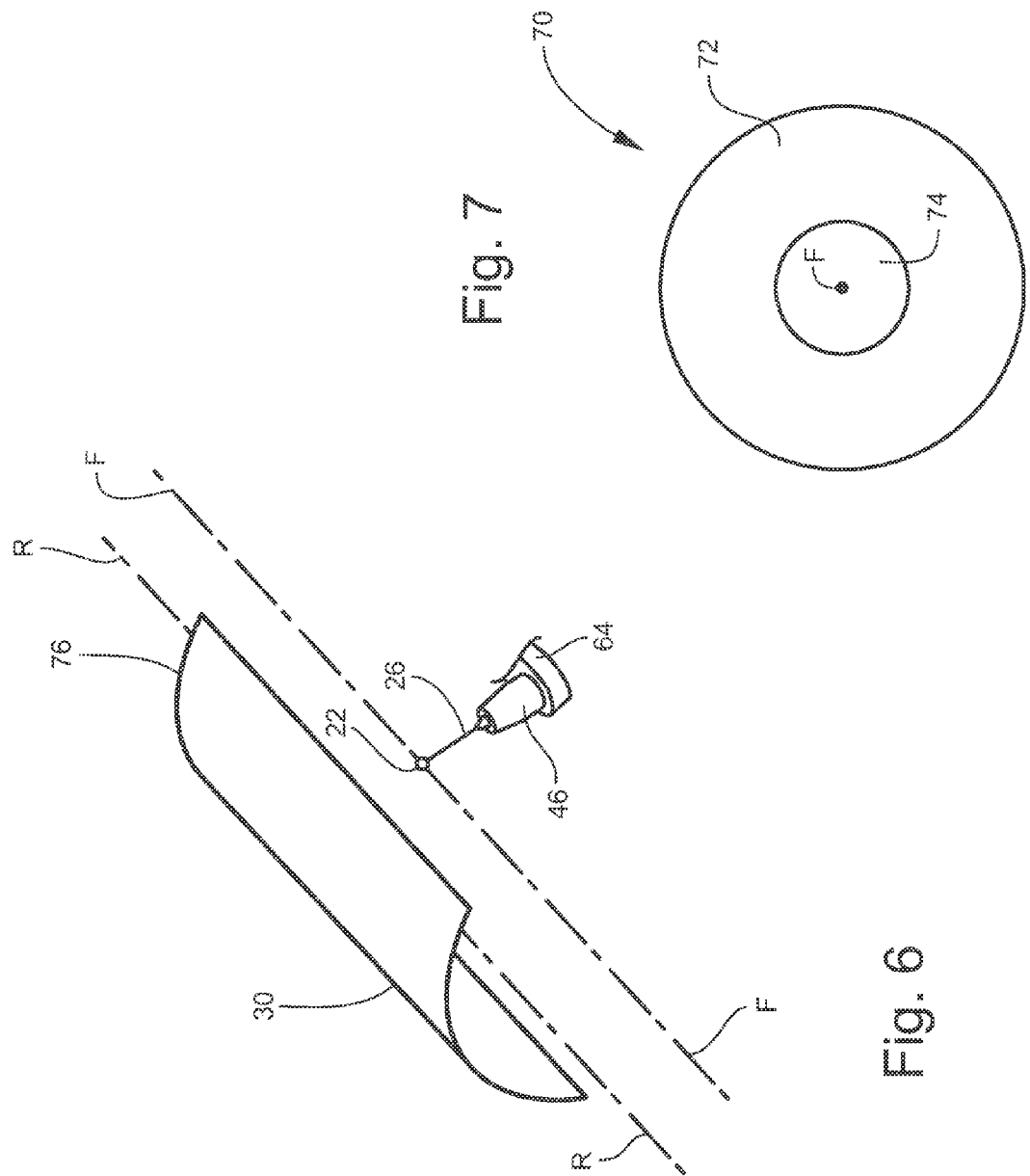

METHOD AND APPARATUS FOR MACRO PHOTOGRAPHIC STEREO IMAGING

CROSS-REFERENCE TO RELATED APPLICATIONS

The present application claims priority to and is a division of U.S. application Ser. No. 13/983,620 filed on Mar. 12, 2012, which claims the benefit of priority of U.S. provisional patent application Ser. No. 61/465,598 filed on Mar. 11, 2011. The referenced applications are expressly incorporated by reference herein.

STATEMENT OF GOVERNMENT INTEREST

The invention described herein may be manufactured, used and licensed by or for the United States Government.

BACKGROUND OF THE INVENTION

The invention relates in general to macro photography and in particular to creating high resolution, three-dimensional, macro photographic digital images.

Disease vectors, for example, mosquitoes, ticks, sandflies, etc., transmit debilitating diseases. Accurate identification of these disease vectors in the field by lay people has always been a problem. Detailed, high resolution images of these small disease vectors, labeled with the name of the disease vector, would be very helpful for those in the field as in aid in identifying the disease vectors. Such images may be formatted for display on, for example, mobile devices such as, for example, smart phones. In a military setting, the images may be stored on or transmitted to mobile devices carried by deployed soldiers.

In addition, a portable macro photographic device for creating the detailed, high resolution images in the field would be very helpful. Images created by the macro photographic device may be transmitted over long distances to a multitude of clients using modern telecommunication techniques.

Even with modern optics, the very shallow depth of field available for these tiny organisms results in macro photographs that are mostly out of focus. One way to create better macro images of a small specimen is to take a series or stack of photos of the specimen along the static line of focus of a camera, with each photo having an overlapping focus depth with the next photo in the stack. The series or stack of photos may be used as inputs for any one of several commercially available photo stitching computer programs. The computer programs extract the in-focus areas from each photo and stitch the extracted in-focus areas together to create a single fully focused image.

Photographic apparatus and software for automatically creating a single focus stacked image from a series of photos are available from, for example, Syncroscopy USA, 5108 Pegasus Court, Suite M, Frederick, Md. 21704, USA (www.syncroscopy.com) or Four Chambers Studio, LLC, Vallejo, Calif., USA (GIGAmacro products) (www.gigamacro.com). Other focus stacking software includes Zerene Stacker and Helicon Focus.

Apparatus for automatically and accurately moving a camera to create a stack of images are known and include, for example, the StackShot automated macro rail produced by Cognisys Inc., 6900 Jackson Pine Drive, Kingsley Mich. 49649 (www.cognisys-inc.com); and the GIGAmacro Professional Imaging System produced by Four Chambers Studio, LLC, Vallejo, Calif., USA. U.S. Patent Application Publication US 2011/0123188 published on May 26, 2011 in the name of Cardwell et al. and entitled "Motor Controlled Macro Rail for Close-Up Focus-Stacking Photography" discloses an automated macro rail that is the same as or similar to Cognisys's StackShot macro rail. U.S. Patent Application Publication US 2011/0123188 is expressly incorporated by reference herein.

The known apparatus move the camera. The camera may be relatively massive and, accordingly, the movement mechanisms for the camera must possess the requisite power and strength. In addition, moving the relatively massive camera creates problems related to stability, vibration, backlash, etc. that may negatively affect image quality.

The known apparatus suitable for focus stacked images are generally not suitable for capturing images of the entire surface area of a specimen. An apparatus for capturing the entire surface area of a specimen is disclosed in, for example, U.S. Patent Application Publication US 2011/0069880 published on Mar. 24, 2011 in the name of Sergieiev and entitled "Three-Dimensional Photographic System and a Method of Creating and Publishing 3D Digital Images of an Object." Sergieiev's device is not suitable for focus stacked macro photography because, for example, the camera is a fixed distance from the specimen.

A long-felt and unsolved need exists for a macro photographic apparatus for capturing focus stacked images of the entire surface area of a specimen.

SUMMARY OF THE INVENTION

One aspect of the invention is a macro photographic apparatus for creating focus stacked images of a specimen. The apparatus may include a rigid longitudinal member having a longitudinal axis and including a camera mount thereon. A translation device may be fixed to the member for translating the specimen along the member toward and away from the camera mount. A rotation device may be mounted on the translation device. The rotation device may support the specimen and enable rotation of the specimen around a first axis that is perpendicular to the longitudinal axis. The rotation device may fix the specimen at selected rotational positions around the first axis. The rotation device may enable rotation of the specimen around a second axis that is orthogonal to the first axis. The rotation device may fix the specimen at selected rotational positions around the second axis.

At any single position of the translation device along the longitudinal axis of the member, as the specimen is rotated around the first axis and the second axis, the spatial location of the specimen may remain substantially the same.

The apparatus may include a digital camera fixed to the camera mount. The digital camera may include a macro lens. At least one camera flash may be fixed for translation with the translation device. The digital camera may define a static line of focus parallel to the longitudinal axis of the member.

The rotation device may enable 360 degree rotation of the specimen around each of the first and second axes. The rotation device may include a rotary stage. The rotation device may include a gimbal fixed to the rotary stage. A specimen holder may be supported at one end by the gimbal.

An optical reflector may be disposed adjacent the specimen. The camera flash may be aimed at the optical reflector such that the reflector reflects light from the camera flash onto the specimen. An optical shield may shield the specimen from direct light from the camera flash. The optical shield may be fixed to translate with the translation device. A second optical reflector may be disposed generally opposite to the optical reflector for reflecting light from the optical reflector onto the specimen. An annular reflector may be centered on the static line of focus between the macro lens and the specimen.

Another aspect of the invention is a macro photographic method for creating focus stacked images. The method may include (A) providing a camera with a macro lens, and a specimen; (B) taking a series of photos of the specimen at a plurality of locations along a static line of focus of the camera by translating the specimen along the static line of focus and not translating the camera; (C) forming a focus stacked image of the series of photos; (D) rotating the specimen a selected angular amount around a first axis that is perpendicular to the static line of focus of the camera; (E) taking a second series of photos of the specimen at a plurality of locations along the static line of focus; and (F) forming a second focus stacked image of the second series of photos.

The method may include: (G) repeating steps (D)-(F) to thereby create a plurality of focus stacked images corresponding to respective angular positions of the specimen around the first axis.

The method may include: (H) rotating the specimen a selected angular amount around a second axis that is perpendicular to both the first axis and the static line of focus of the camera; (I) taking a third series of photos of the specimen at a plurality of locations along the static line of focus; and (J) forming a third focus stacked image of the third series of photos.

The method may include: (K) repeating steps (H)-(J) to thereby create a plurality of focus stacked images corresponding to respective angular positions of the specimen around the second axis.

Step (G) may be repeated until the specimen has been rotated 360 degrees around the first axis and step (K) may be repeated until the specimen has been rotated 360 degrees around the second axis to thereby create focus stacked images of the entire surface area of the specimen.

A pair of sequential focus stacked images may be combined to form a cross-eyed stereo image. The focus stacked images corresponding to one of the first and second axes may be combined to form a three-dimensional image. The focus stacked images corresponding to both the first and the second axis may be combined to form a UV map of the specimen.

Steps (B) and (E) of the method may include illuminating the specimen indirectly with a camera flash. Steps (B) and (E) may include shielding the specimen from direct illumination from the camera flash. Steps (B) and (E) may include translating the camera flash with the specimen. Steps (D) and (H) may include maintaining the specimen in substantially a same spatial location.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 4 is a top view of a portion of a longitudinal member that uses the sled of FIG. 3 as a translation device.

FIG. 5 is top schematic view of a portion of a macro photographic apparatus.

FIG. 6 is a perspective view of an optical reflector.

FIG. 7 is a front view of an annular reflector.

DETAILED DESCRIPTION

Figure 1:
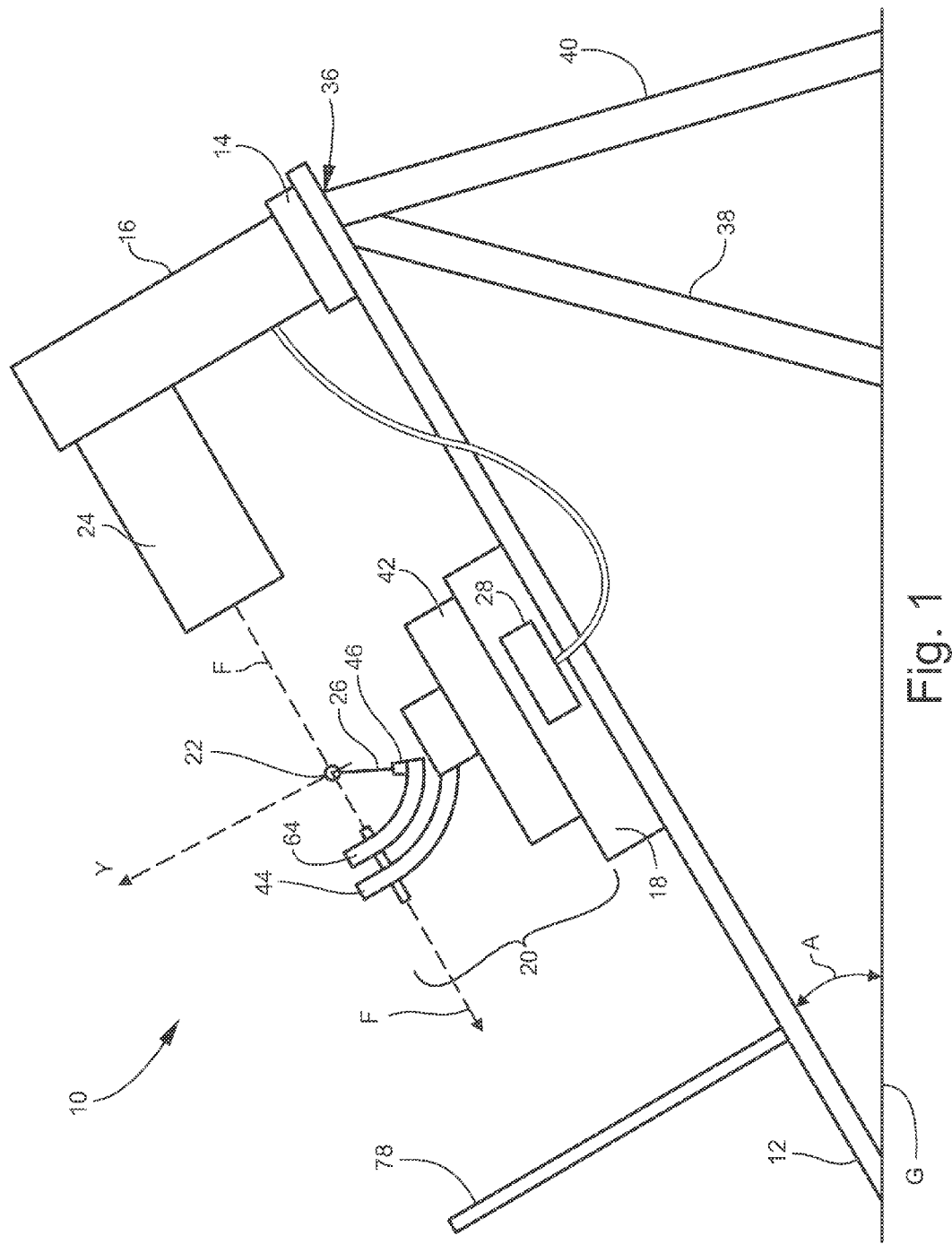
FIG. 1 is a schematic side view of one embodiment of a macro photographic apparatus for creating focus stacked images of a specimen.

A macro scale photographic method may be used to generate extremely high resolution two-dimensional and three-dimensional digital images of small specimens. The method may include providing a camera with a macro lens. When creating the digital images, the camera may remain stationary in a fixed position. A specimen to be photographed may be mounted on a translation device so that the specimen may be translated along the static line of focus of the camera, while the camera remains stationary.

In the case where the specimen is small (such as an insect) and fills the frame of the macro lens, typically less than one tenth of the depth of the specimen will be in focus in a single photo. Thus, a series or stack of photos may be taken along the static line of focus of the camera by translating the specimen in precise increments, with each photo having overlapping focus depth with the next photo in the stack. The number of photos in the stack may vary, for example, 20 to 80 or more. The stack of photos may be input into a known computer program to create a single fully focused image.

By rotatably mounting the specimen on the translation device, the specimen may be rotated about a pair of axes that are perpendicular to each other and perpendicular to the static line of focus of the camera. The rotation device may be fixed to the translation device. The rotation device may be, for example, a manual or motorized rotary stage in combination with a gimbal. Or, the rotation device may be two gimbals.

After the first stack of images are taken along the static focus line of the camera, the specimen may be rotated a selected angular amount, for example, five degrees, about an axis that is perpendicular to the static line of focus. Then, a second stack of photos of the specimen may be taken, in a manner similar to the first stack of photos, but with the specimen rotated from its position in the first stack of photos. The focused portions of the second stack of photos may be extracted and combined to form a focus stacked image of the second series of photos. Using the two focused stacked images, a single cross-eyed stereo image may be created using known computer software.

Additional focused stacked images may be created by taking a series or stack of photos at respective multiple angular positions of the specimen about the rotation axis. The multiple angular positions may be, for example, five degrees apart. Thus, 72 series or sets of photos may be taken at five degree increments to create 72 focused stacked images that represent a 360 degree view of the specimen around the axis. These 72 focused stacked images may be combined with known computer software to create a three-dimensional image.

In some embodiments, the rotation device includes two mutually perpendicular axes of rotation, both of which are perpendicular to the static line of focus of the camera. Thus, the specimen may be rotated about the second axis in a manner similar to the first axis to create, for example, 72 series or sets of photos taken at five degree increments about the second axis. Each of the 72 sets of photos may be processed to produce 72 single focus stacked photos.

The two sets of 72 focus stacked photos represent the entire surface area of the specimen. The two sets of 72 focus stacked photos (144 photos total) may be combined in a known manner to produce a UV map of the specimen. The UV map may then be applied to an object mesh to create a photorealistic 3D model of the specimen. The five degree increment of rotation is an example only, other increments may be used to produce more or less sets of focus stacked photos.

In some embodiments, the specimen may be illuminated indirectly by a camera flash device. Indirect illumination may produce higher quality images. A reflector may be disposed above the specimen. The camera flash may be aimed at the reflector. The specimen may also be shielded to block direct illumination from the camera flash. A second reflector may be placed opposite the first reflector to better illuminate the underside of the specimen. The camera flash device may translate with the specimen as the series of photos are taken.

FIG. 1 is a schematic side view of one embodiment of a macro photographic apparatus 10 for creating focus stacked images of a specimen 22. In general, specimen 22 may be relatively small. For example, the disease vectors may vary from mite-sized arthropods with a 0.2 mm length to insects with a 500 mm length. Apparatus 10 may include a rigid longitudinal member 12 having a longitudinal axis and including a camera mount 14 thereon. A digital camera 16 may be fixed to camera mount 14. Digital camera 16 may include a macro lens 24. Camera 16 may be, for example, a 35 mm high resolution DSLR (digital single lens reflex) camera such as the Canon 5D Mark II (21 Megapixel resolution) camera. Macro lens 24 may be, for example, a Canon 65 mm MP-E Macro f2.8 1X-5XA lens. Camera 16 fixed on member 12 may define a static line of focus F substantially parallel or parallel to the longitudinal axis of member 12.

A translation device 18 may be fixed to member 12 for translating specimen 22 along longitudinal member 12 toward and away from camera 16. A rotation device 20 may be mounted on translation device 18. Rotation device 20 may support specimen 22 via a specimen holder 26. Specimen holder 26 may be, for example, a mounting needle. Rotation device 20 may enable rotation of specimen 22 around a first axis Y that is perpendicular to static line of focus F of camera 16 and the longitudinal axis of member 12. Rotation device 20 may fix specimen 22 at selected rotational positions around axis Y. Rotation device 20 may also enable rotation of specimen 22 around a second axis Z that is orthogonal to axis Y and static line of focus F of camera 16. Axis Z is orthogonal to the view of FIG. 1 and intersects the intersection of axis Y and static line of focus F. Rotation device 20 may fix specimen 22 at selected rotational positions around axis Z. Rotation device 20 may enable 360 degree rotation of specimen 22 around each of axes Y and Z.

In FIG. 1, member 12 is shown inclined at an angle A with respect to a ground level G. Angle A may be, for example, from about 20 to about 50 degrees. The inclination of member 12 may prevent backlash that may occur if translation device 18 utilizes the rotation of a threaded rod to translate specimen 22. However, in some embodiments of the invention, member 12 may be horizontal. Member 12 may be, for example, a metal rail made of, for example, aluminum. Member 12 may be about a meter in length. In some embodiments, member 12 may be one leg of a camera tripod 36 having two other legs 38, 40. Tripod 36 may be useful for using apparatus 10 in the field. Tripod 36 may be capable of extending at least one leg (member 12) at a 90 degree angle to the center axis of tripod 36. An example of tripod 36 is Really Right Stuff's TP-243 Ground-Level Tripod. If member 12 is not a leg of a camera tripod, then another type of support, such as a wide, shallow, inverted U-shaped tube may be used to support member 12.

In some embodiments, translation device 18 may be an automated macro photography focus assembly, such as the device that is fully disclosed in U.S. Patent Application Publication US 2011/0123188 published on May 26, 2011 in the name of Cardwell et al. and entitled "Motor Controlled Macro Rail for Close-Up Focus-Stacking Photography." A commercial embodiment of the Cardwell et al. device is named the StackShot and is produced by Cognisys Inc., 6900 Jackson Pine Drive, Kingsley Mich. 49649. The StackShot is designed to have a camera mounted thereon, and to translate the camera.

In apparatus 10, in contrast, camera 16 is fixed to member 12 and specimen 22 is translated. Nevertheless, the StackShot may be adapted for use in apparatus 10 by fixing the base of the StackShot to member 12 using, for example, an Arca clamp. The StackShot is oriented on member 12 so that the axis of translation of the StackShot carriage is parallel to static line of focus F of camera 16. Then, rotation device 20 may be fixed to the translatable carriage of the StackShot using, for example, threaded fasteners. The Stackshot includes a motor for driving its translatable carriage, and a controller assembly. The controller assembly is connected to the shutter of camera 16 and to the StackShot motor. The StackShot controller assembly may be programmed to create a series or stack of photos of specimen 22 which may then be focus stacked into a single image.

The StackShot controller allows the user to pick a start and stop point for specimen movement and select the number of individual photos to be taken. It then translates the specimen 22 a pre-set distance, stops, activates the camera shutter and flash, and then translates again until the entire range from start to stop point has been covered.

Of course, rather than an automatic device like the StackShot, a manual device, such as a long threaded rod rotatably mounted in a slot in member 12, may be used as translation device 18. The StackShot is advantageous because the translation movement of specimen 22 and the actuation of camera 16 may be automated. Because translation device 18 is used to move very small and lightweight specimens 22, and the StackShot is designed to move comparatively massive cameras, a desirable modification to the StackShot would be to greatly reduce the size and strength of its mechanical components and the power capacity of its motor.

Figure 2:
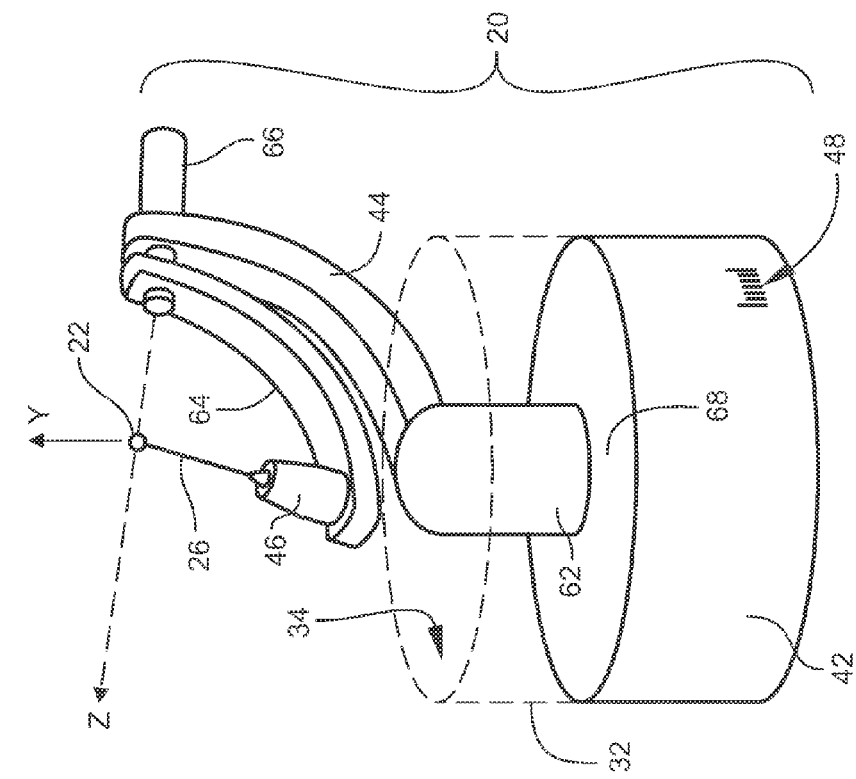
FIG. 2 is a perspective view of one embodiment of a rotation device for use with the apparatus of FIG. 1.

FIG. 2 is a perspective view of one embodiment of rotation device 20. Rotation device 20 may include, for example, two main components. One component may be a rotary stage 42. Rotary stage 42 may be manually rotated or may be rotated by a stepper motor. Rotary stage 42 may include calibrations 48 in units of angular measurement of rotation around the Y axis. Suitable manual and motorized rotary stages may be obtained from Edmund Optics, Inc., 101 East Gloucester Pike, Barrington, N.J., 08007-1380 USA.

If the StackShot is used as translation device 18, rotary stage 42 may be fixed to the StackShot translating carriage with, for example, threaded fasteners.

Figure 3:
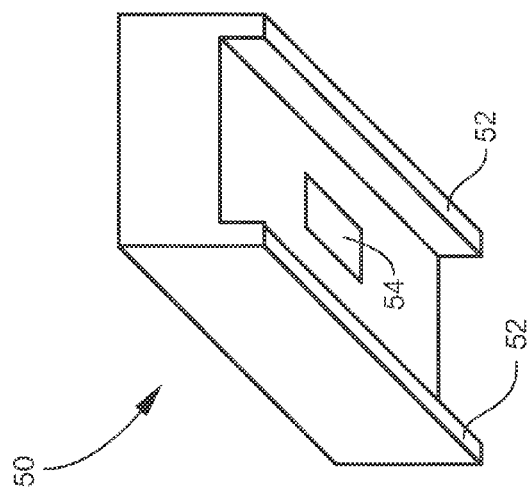
FIG. 3 is a bottom perspective view of a translating sled.

If a manually threaded rod is used as translation device 18, rotary stage 42 may be fixed to the top side of a translating sled 50 (FIG. 3) using, for example, threaded fasteners. FIG. 3 is a bottom perspective view of sled 50. The planar top side of sled 50 is hidden from view in FIG. 3. The bottom side of sled 50 may include guide rails 52 which slide on the outside edges 56 of member 12 (FIG. 4) and an opening 54 for receiving a follower nut 58 (FIG. 4). Nut 58 may threadingly engage a threaded rod 60. Rotation of rod 60 causes translation of sled 50 and translation of rotary stage 42 that is fixed to sled 50.

Another component of rotation device 20 may be a gimbal 44 (FIG. 2). Gimbal 44 may be fixed to rotary stage 42 by a threaded column 62. Gimbal 44 may include an arm 64 that is rotatable about the axis of a shaft and threaded nut 66. The axis of nut 66 may be the Z-axis, which is perpendicular to the Y axis of rotation of rotary stage 42 and perpendicular to static line of focus F. A micro wire gripper 46 may be fixed to an end of rotating arm 64. Gripper 46 may fix one end of specimen holder 26. Notably, at any single axial location along static line of focus F, as specimen 22 is rotated around the Y and Z axes, the spatial location of specimen 22 remains substantially the same. Gimbal 44 may include calibrations in units of angular measurement of rotation around the Z axis. Arm 64 may be manually rotated or may be coupled to a stepper motor.

FIG. 5 is a top schematic view of member 12, translation device 18 and rotary stage 42. Apparatus 10 may include at least one camera flash device 28 operably connected to camera 16. Flash devices 28 may be fixed for translation with translation device 18. One flash device 28 may be fixed to one lateral side of translation device 18 and another flash device 28 may be fixed to an opposite lateral side of translation device 18. Flash devices 28 may be, for example, a Canon MT-24EX twin light flash.

Images of specimen 22 may be of better quality if specimen 22 is indirectly illuminated. An optical reflector 30 (FIG. 6) may be disposed adjacent or above specimen 22. Reflector 30 may have the shape of a half of a hollow cylinder, for example. Reflector 30 may be situated over specimen 22 such that a longitudinal axis R of reflector 30 is parallel to and coplanar with static line of focus F and the longitudinal axis of member 12. In some embodiments, axis R may be coincident with static line of focus F. Reflector 30 may be fixed to, for example, camera 16 or translation device 18. Specimen 22 may often be within about three inches of camera 16, so mounting reflector 30 to camera 16 may be acceptable. Flash devices 28 may be aimed at optical reflector 30 so that reflector 30 reflects light from flash devices 28 onto specimen 22.

To enhance the indirect lighting of specimen 22, apparatus 10 may include an opaque optical shield 32 (shown in dashed lines in FIG. 2) for shielding specimen 22 from direct light from flash devices 28. Optical shield 32 may be fixed to translate with translation device 18 by mounting shield 32 to rotary stage 42. Shield 32 may have the shape of a hollow cylinder. Another optical reflector 34 (FIG. 2) may be disposed on an opposite side of specimen 22 from reflector 30. Reflector 34 may include the top surface 68 of rotary stage 42, which may be coated with a reflective coating, and the interior surfaces of shield 32. Reflector 34 may reflect light from reflector 30 onto an underside of specimen 22.

To further enhance the lighting of specimen 22, an annular reflector 70 (FIG. 7), known as a Lieberkuhn reflector, may be included with apparatus 10. Reflector 70 may include a reflecting surface 72 and an opening 74. Reflecting surface 72 faces specimen 22. Reflecting surface 72 may be planar or concave. Reflector 70 is disposed such that static line of focus F contains the center of opening 74. Reflector 70 may be centered on static line of focus F between macro lens 24 and specimen 22. Reflector 70 may be, for example, mounted to macro lens 24, or, attached to a camera-side end 76 (FIG. 6) of reflector 30. The outer diameter of reflector 70 may be the same as the outer diameter of a cylinder that defines reflector 30. Reflector 70 may create a diffuse lighting on a front surface (surface facing lens 24) of specimen 22 while permitting the entire focal cone of light to pass into the small front element of macro lens 24. Also, a suitably colored backdrop 78 (FIG. 1) may be mounted to longitudinal member 12 to enhance the quality of digital images of specimen 22.

The details, materials, steps and arrangement of parts have been described and illustrated to explain the nature of the invention. It will be understood that many additional changes in the details, materials, steps and arrangement of parts may be made by those skilled in the art, within the principle and scope of the invention, as expressed in the appended claims.

What is claimed is:

1. A macro photographic method for creating focus stacked images, comprising:
   (A) providing a camera with a macro lens, and a specimen;
   (B) taking a series of photos of the specimen at a plurality of locations along a static line of focus of the camera by translating the specimen along the static line of focus and not translating the camera;
   (C) forming a focus stacked image of the series of photos;
   (D) rotating the specimen a selected angular amount around a first axis that is perpendicular to the static line of focus of the camera;
   (E) taking a second series of photos of the specimen at a plurality of locations along the static line of focus; and
   (F) forming a second focus stacked image of the second series of photos.

2. The method of claim 1, further comprising,
   (G) repeating steps (D)-(F) to thereby create a plurality of focus stacked images corresponding to respective angular positions of the specimen around the first axis.

3. The method of claim 2, further comprising,
   (H) rotating the specimen a selected angular amount around a second axis that is perpendicular to both the first axis and the static line of focus of the camera;
   (I) taking a third series of photos of the specimen at a plurality of locations along the static line of focus; and
   (J) forming a third focus stacked image of the third series of photos.

4. The method of claim 3, further comprising,
   (K) repeating steps (H)-(J) to thereby create a plurality of focus stacked images corresponding to respective angular positions of the specimen around the second axis.

5. The method of claim 4, wherein step (G) is repeated until the specimen has been rotated 360 degrees around the first axis and step (K) is repeated until the specimen has been rotated 360 degrees around the second axis to thereby create focus stacked images of the entire surface area of the specimen.

6. The method of claim 5, wherein a pair of sequential focus stacked images are combined to form a cross-eyed stereo image.

7. The method of claim 5, wherein the focus stacked images corresponding to one of the first and second axes are combined to form a three-dimensional image.

8. The method of claim 5, wherein the focus stacked images corresponding to both the first and the second axis are combined to form a UV map of the specimen.

9. The method of claim 3, wherein steps (D) and (H) include maintaining the specimen in substantially a same spatial location.

10. The method of claim 1, wherein steps (B) and (E) include illuminating the specimen indirectly with a camera flash.

11. The method of claim 10, wherein steps (B) and (E) include shielding the specimen from direct illumination from the camera flash.

12. The method of claim 10, wherein steps (B) and (E) include translating the camera flash with the specimen.

* * * * *